United States Patent
Hanna et al.

(10) Patent No.: US 6,641,077 B2
(45) Date of Patent: Nov. 4, 2003

(54) SAFETY BELT APPARATUS FOR VEHICLES

(75) Inventors: Harry Hanna, Craigavon (GB); Robert Kopetzky, Lonsee (DE); Martin Wifling, Neu-Ulm (DE)

(73) Assignee: Takata - Petri (Ulm) GmbH, Ulm (DE)

( * ) Notice: Subject to any disclaimer, the term of this patent is extended or adjusted under 35 U.S.C. 154(b) by 0 days.

(21) Appl. No.: 09/736,252

(22) Filed: Dec. 15, 2000

(65) Prior Publication Data

US 2001/0004094 A1 Jun. 21, 2001

(30) Foreign Application Priority Data

Dec. 15, 1999 (DE) .......................................... 199 60 554

(51) Int. Cl.⁷ .............................................. B60R 22/38
(52) U.S. Cl. ..................... 242/382.2; 280/806; 280/807
(58) Field of Search ........................... 242/382.2, 382.4; 280/806, 807

(56) References Cited

U.S. PATENT DOCUMENTS

| | | | |
|---|---|---|---|
| 4,597,546 A | 7/1986 | Yamamoto et al. | 242/107.4 |
| 5,328,120 A | 7/1994 | Schmid | 242/382.4 |
| 5,765,773 A | 6/1998 | Hanna et al. | 242/383.2 |
| 5,794,879 A | 8/1998 | Huber | 242/382.2 |
| 6,109,556 A | 8/2000 | Kopetzky et al. | 242/382.2 |

FOREIGN PATENT DOCUMENTS

| | | |
|---|---|---|
| DE | 29 24 575 | 2/1981 |
| DE | 33 42 478 | 5/1984 |
| DE | 3636073 | 4/1988 |
| DE | 42 07 579 | 9/1993 |
| DE | 42 27 781 | 2/1994 |
| DE | 296 08 209 | 9/1996 |
| DE | 197 05 361 | 8/1997 |
| DE | 297 17 477 | 11/1997 |
| DE | 196 48 515 | 5/1998 |
| DE | 298 20 086 | 5/1999 |

Primary Examiner—John Q. Nguyen
(74) Attorney, Agent, or Firm—Foley & Lardner

(57) ABSTRACT

A safety belt apparatus for vehicles, in particular motor vehicles having at least one safety belt, which is wound to a greater or lesser degree onto a belt reel rotatably secured on the vehicle chassis about an axis of rotation and preferably biased by a spring retraction mechanism. A toothed ratchet wheel is rotationally coupled to the belt reel and cooperating with a blocking pawl secured to the housing. The blocking pawl is movable into and out of engagement with respect to the toothed ratchet wheel by a cam ring concentric to the belt reel axis via a step down transmission. A toothed control wheel is connected to the belt reel via an eccentric transmission and has at its periphery a preferably wavelike arrangement of teeth which is surrounded by an inner toothed ring fixed to the housing of larger diameter and with complementary, but with a smaller or preferably larger number of teeth. As a results, the toothed control wheel stands in meshing arrangement with the inner toothed ring over a restricted peripheral region and diametrically opposite thereto. The two arrangements of teeth have a radial spacing such that the toothed control wheel rolls off on the inner toothed ring on rotation of the belt reel. The total draw out length of the safety belt corresponds to an angle of rotation of the toothed control wheel relative to the axis of rotation of substantially 180°. The toothed control wheel is rotationally fixedly connected to the cam ring, but radially displaceable in the context of its eccentric movement. The cam ring has a switching means along a first angular region for the engagement and disengagement of the blocking pawl and at least one switching element along a second angular region for at least one further belt draw out dependent switching operation.

14 Claims, 8 Drawing Sheets

SAFETY BELT APPARATUS FOR VEHICLES

The invention relates to a safety belt apparatus for vehicle, in particular motor vehicles.

A safety belt apparatus is already known from GB 2 131 279 A in which the belt reel actuates a cam ring via a step down transmission. By means of a radial projection the cam ring brings the latching pawl which cooperates with the toothed ratchet wheel into engagement with the toothed ratchet wheel when the safety belt is fully drawn out and brings it out of engagement with the toothed ratchet wheel when the safety belt is fully drawn in. In this manner, after a complete draw out of the safety belt, only a pulling in of the safety belt is initially possible. This manner of operation is termed ALR operation (automatic locking retractor operation). After full draw in of the belt, the latching pawl is released by the toothed latching wheel so that now a free draw out of the belt is possible. A draw out blocking mechanism now only enters into operation if an attempt is made to pull the belt out rapidly or if accelerations caused by an accident occur. This manner of operation is termed ELR operation (emergency locking retractor operation).

In this known apparatus the movement of two rotary blocking pawls into a surrounding toothed ring fixed relative to the housing on attempted rapid belt pull out takes place in that a rotary clearance is provided between the belt reel and a toothed ratchet wheel and is removed by a spring acting between the belt reel and the toothed ratchet wheel, until, on attempted belt pull out, a pre-determined rotary acceleration value is exceeded, which leads to the rotation of the toothed ratchet wheel lagging behind the rotation of the belt reel, whereby movement of the blocking pawls into engagement is brought about. A precondition for the operability of the known pull out blocking mechanism is thus that the toothed ratchet wheel rotates with delay relative to the belt reel above a predetermined rotary acceleration value. Problematic with this design of the pull out blocking mechanism is the fact that the relative angular position in which the blocking pawls move towards the surrounding inner ring of teeth fixed relative to the housing cannot be determined in advance. Should the teeth of the blocking pawl and of the inner toothed arrangement by chance stand tooth to tooth during the movement into engagement, then an engagement of the pawl teeth into the tooth recesses of the inner ring of teeth is not possible. Thereafter, an engagement of the blocking pawl into the tooth recesses of the inner ring of teeth is also not ensured with the required certainty as a result of the generally high speed of rotation of the belt reel.

EP 0 298 123 A1 describes a safety belt apparatus in which the transmission which acts on the cam ring is formed as a cycloidal transmission, such as is also used in a safety belt apparatus known from U.S. Pat. No. 5,518,197.

A transmission of this kind is also provided in a safety belt apparatus for motor vehicles (DE 196 48 515 A1), with the cam ring only being rotated through a smaller angle in the end positions of the rotating toothed control wheel, which is just sufficient in order to bring the blocking pawl into or out of engagement with the toothed ratchet wheel. In this known apparatus the inner toothed ring and the toothed control wheel are preferably so formed that the toothed control wheel can execute about a one half revolution between full belt draw in and full belt draw out.

In all previously known safety belt apparatuses with a switching cam ring, the latter has the task of bringing the preferably resiliently deflectable blocking pawl into or out of engagement with the toothed ratchet wheel connected to the belt reel.

SUMMARY OF THE INVENTION

The object of the present invention is to provide a further safety belt apparatus of the initially named kind in which the cam ring in particular is better exploited.

The concept underlying the invention is thus to be seen in the fact that at least one further switching function is associated with the cam ring in addition to the function of bringing the resiliently deflectable blocking pawl into and out of engagement with the toothed ratchet wheel in defined manner.

This is achieved in that the periphery of the cam ring is subdivided into a plurality of regions, preferably two regions, of which only one takes on the blocking pawl switching function, whereas the other is available for triggering of further switching functions. Since, in accordance with the invention, a part region of the periphery of the cam ring is to be available for other than blocking pawl switching purposes, the angular region which is available for the blocking pawl switching should be about 180° or somewhat more (up to ca. 200°). The remainder of the periphery of the cam ring can then be designed, for example, with magnetic, electrical and/or mechanical elements, so that one or more further switching functions are triggered at specific angles of rotation of the cam ring. For this purpose stationary elements, such as mechanically, electrically or magnetically actuated switches are provided radially opposite to the relevant part of the peripheral surface and cooperate with the associated elements on the cam ring.

A special embodiment of the present invention makes provision for a belt tensioner to be activated or deactivated by the additional peripheral surface on the cam ring. It is namely expedient to deactivate a belt tensioner with a non-applied, i.e. drawn-in safety belt, and to first activate it when it has been pulled out by a predetermined amount which is not, however, sufficient in order to be placed around the occupant to be protected. In this manner it is ensured that the belt tensioner is in any event activated after being placed onto an occupant to be protected. Through the invention, the respective activation or deactivation can be effected by the same cam ring which is already responsible for the movement of the blocking pawl in and out of engagement.

A preferred practical realization of the concept of the invention includes the use of a tilting element brings about the advantage that a once set blocking pawl position is maintained until a counter-force acts on the tilting element.

The rotationally fixed and simultaneously radially displaceable connection of the toothed control wheel to the cam ring expediently takes place in accordance with features of the invention described further below.

In order to avoid the disadvantages associated with the pull out blocking mechanism of GB 2 131 279 A, the invention provides the certain features. In this manner the trouble-free movement of the teeth of the engageable pawl into the surrounding inner ring of teeth can be ensured, since a fixed and predeterminable angular relationship exists between the angles at which the toothed ratchet wheel is stopped by the blocking tooth and the position of these engageable pawl. The features are a precondition for the precise movement of the engageable pawl into engagement, i.e. that on exceeding the predetermined acceleration boundary value of the belt reel, and with the belt pull out acceleration which normally prevails, the speed of rotation of the toothed ratchet wheel does not lag behind that of the belt reel. In this way an undefined engagement of the engageable pawl into the surrounding inner toothed arrangement is reliably avoided. With extremely large belt pull out accelerations caused by an accident, a rotation of the toothed ratchet wheel is in any event stopped by the generally provided blocking mechanism for the toothed ratchet wheel, which responds to pronounced vehicle accelerations or decelerations and large deviations of the vehicle from the horizontal position. In this case the belt pull out blocking mechanism is thus not required.

BRIEF DESCRIPTION OF THE DRAWINGS

The invention will be described in the following by way of example with reference to the drawings in which are shown.

DETAILED DESCRIPTION

Figure 1:
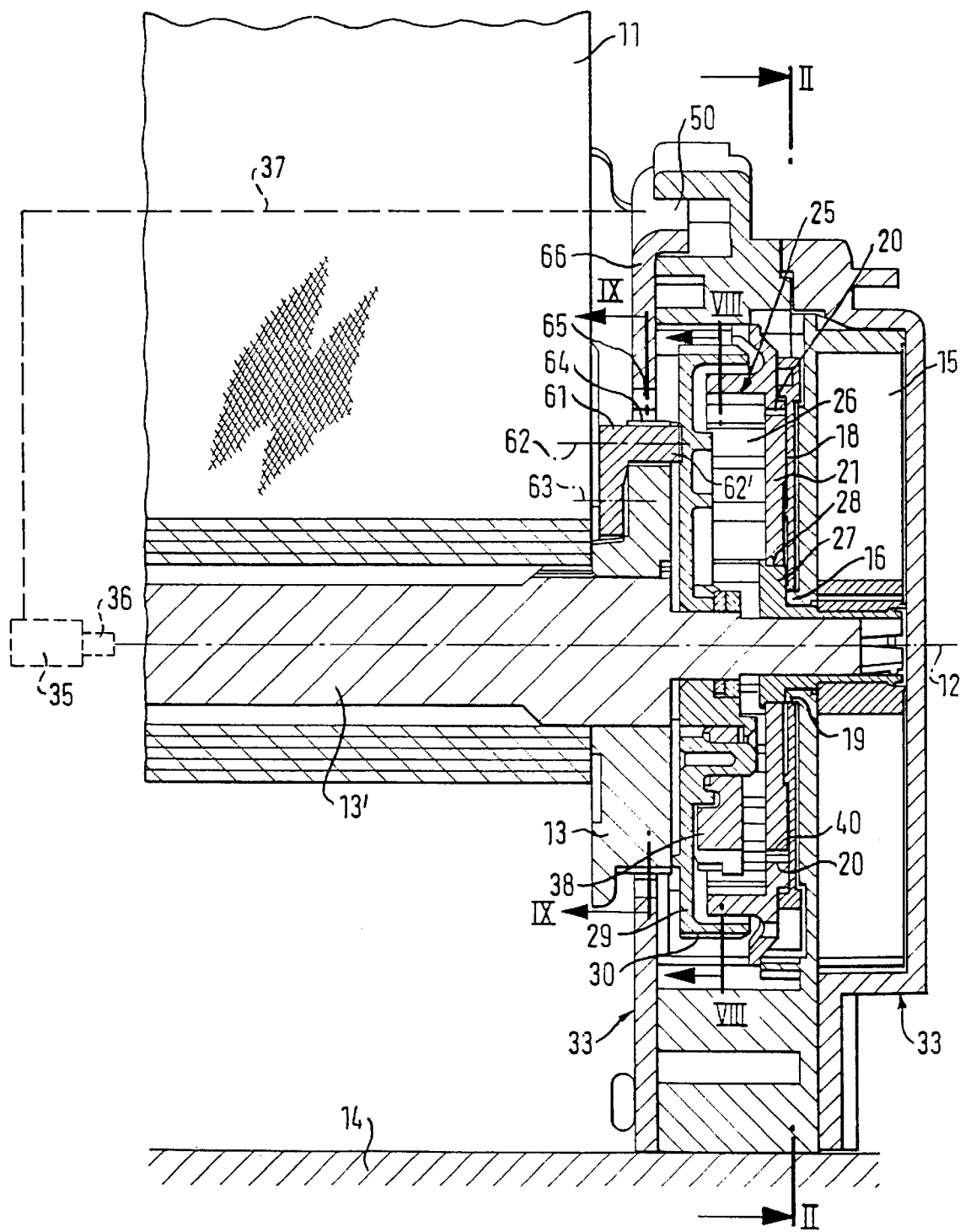
FIG. 1 a schematic partly sectioned partial view of a belt reeling mechanism in accordance with the invention, FIG. 2 a sectional view on the line II—II in FIG. 1 which is slightly reduced relative to FIG. 1, with the belt reel being located in the rest position with the fully drawn-in safety belt, FIG. 3 the same view as FIG. 2 but with the safety belt drawn out by about 600 mm, FIG. 4 a further similar view with a fully drawn out safety belt, FIG. 5 a like view during the drawing in of the initially fully drawn out safety belt by the retraction spring, with the safety belt being located in the region between full draw-out and a draw-out by about 600 mm, FIG. 6 the same view with the safety belt only drawn out by 600 mm, FIG. 7 a schematic perspective exploded illustration of the switching and driving part of a belt reeling mechanism in accordance with the invention, FIG. 8 a schematic sectional view essentially in accordance with the line VIII—VIII in FIG. 1, and FIG. 9 a schematic sectional view essentially in accordance with the line IX—IX in FIG. 1.
Figure 2:
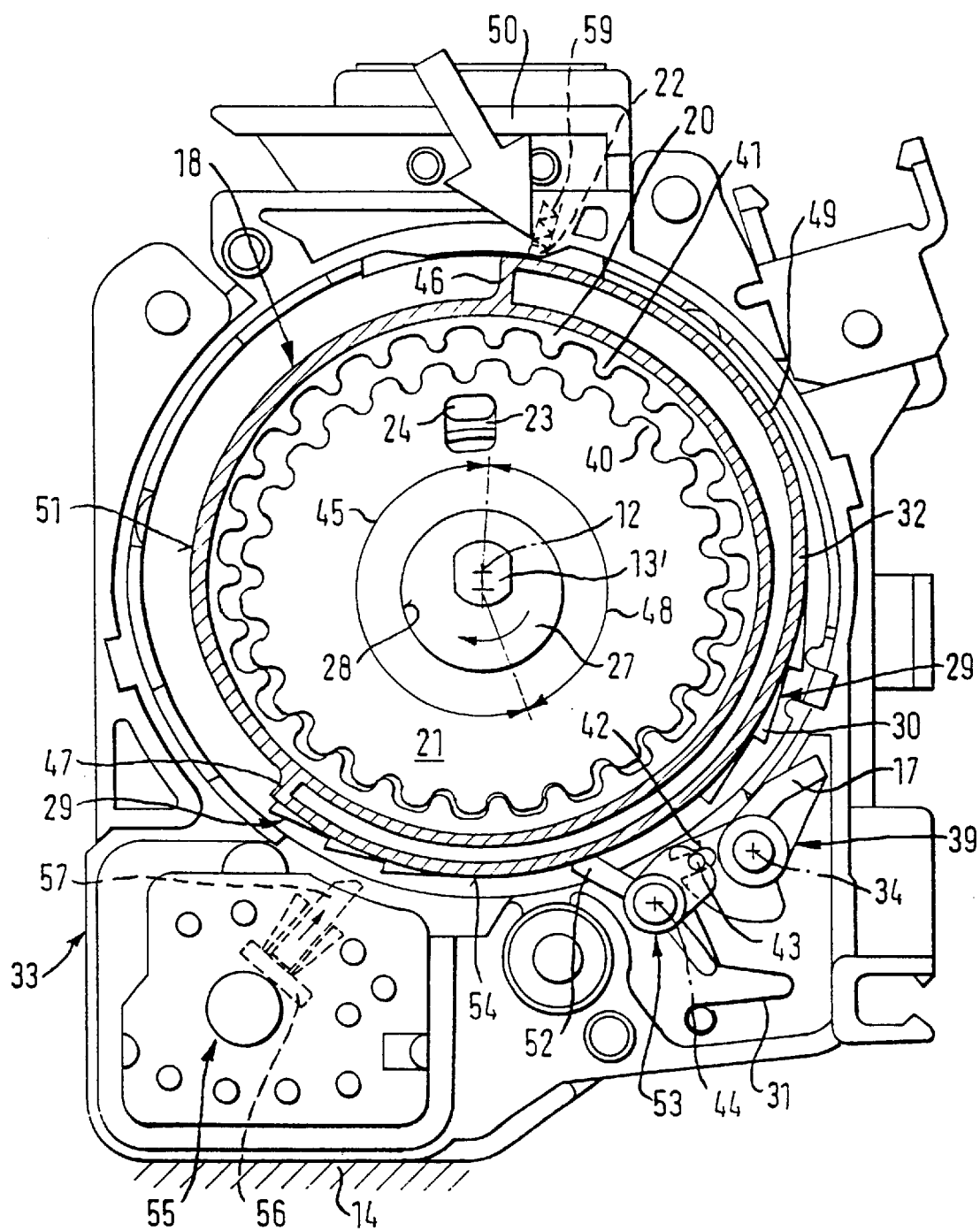
Figure 3:
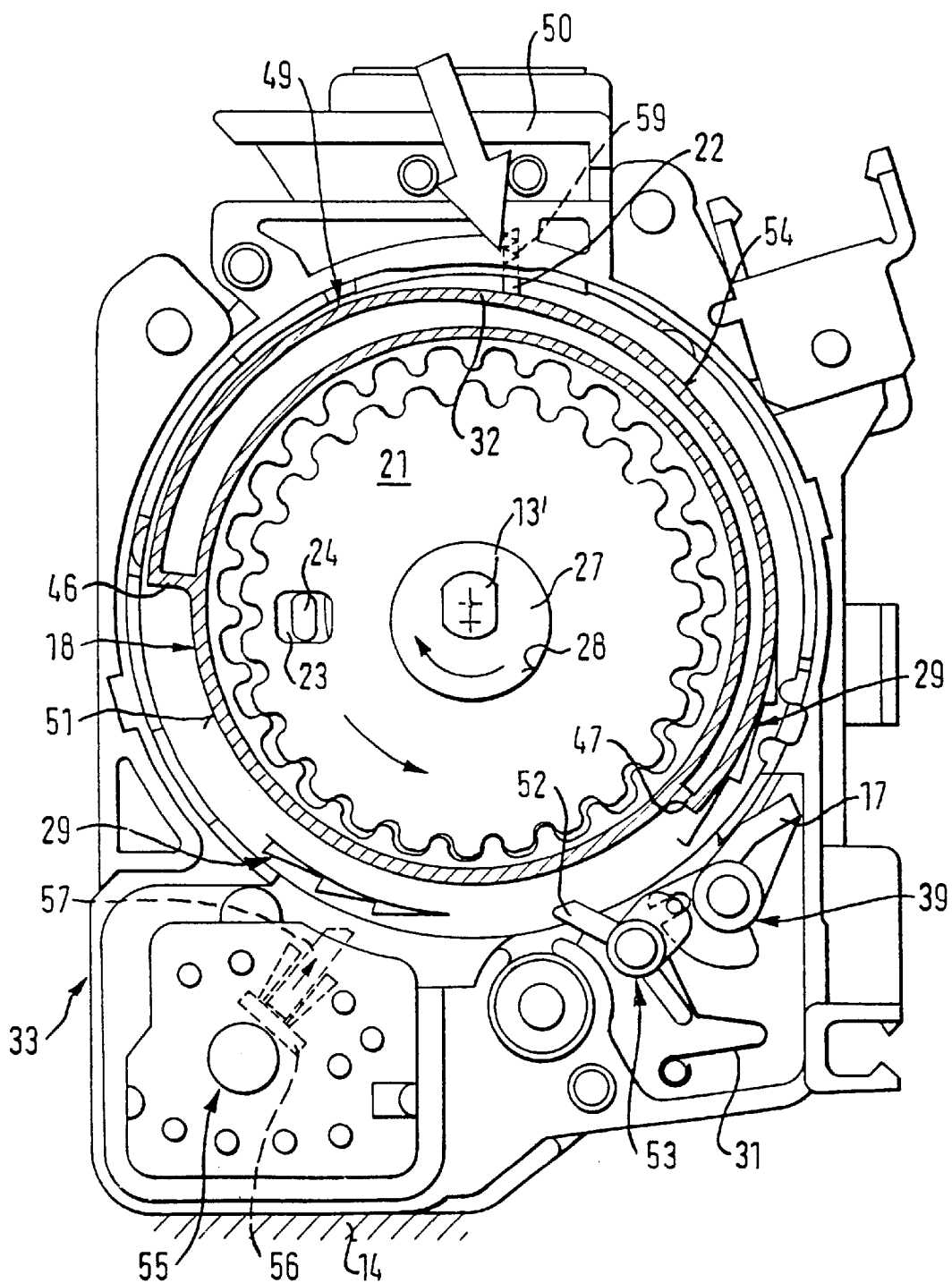

In accordance with FIGS. 1 and 2 a safety belt 11 is wound onto an only partly illustrated belt reel 13 with a shaft 13' and an axis of rotation 12. A housing 33 is secured in the schematically indicated manner to the vehicle chassis 14.

A toothed ratchet wheel 29 which has ratchet teeth 30 around its periphery, which are only partly indicated in FIGS. 2 to 6, sits with a rotary clearance of ca. 15° on the right-hand end region of the shaft 13' in FIG. 1, and the plane of the toothed ratchet wheel stands perpendicular to the axis of rotation 12.

Figure 8:
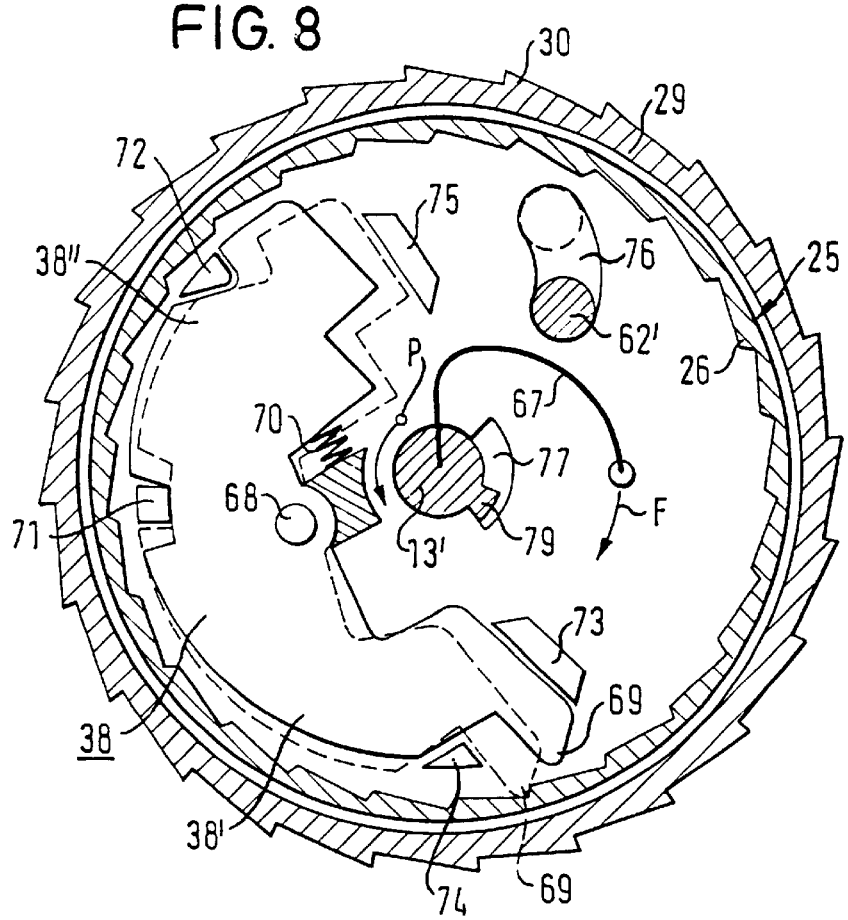
Figure 9:
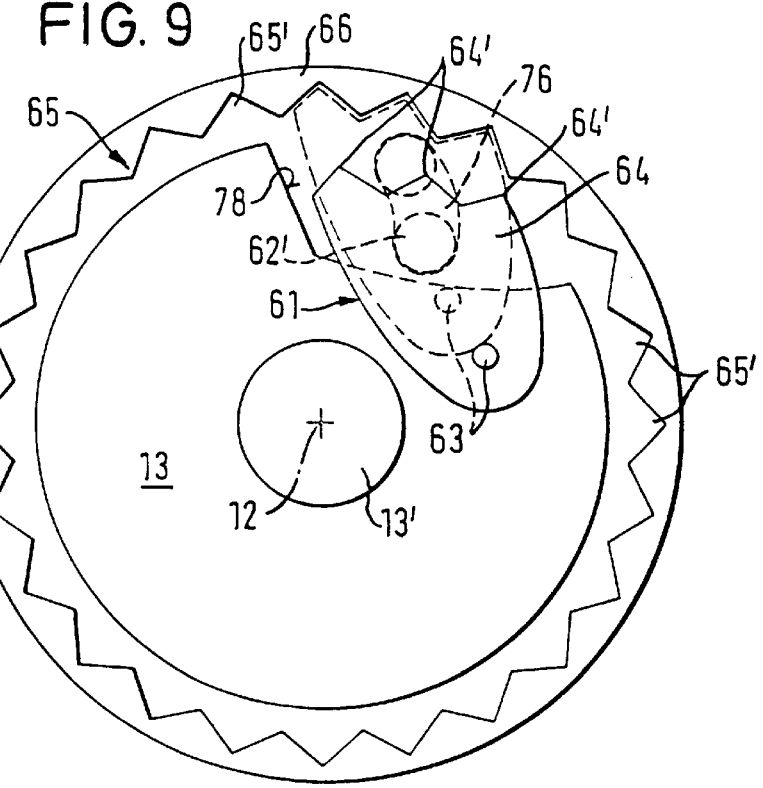

In accordance with FIGS. 1, 8 and 9, a pawl 61 which can be moved into engagement is rotationally and displaceably mounted in a curved, elongate slot 76 of the toothed ratchet wheel 29 at approximately two thirds of its radius, by a guide spigot 62' having an axis 62 extending parallel to the axis of rotation 12.

In accordance with FIGS. 1 and 9, the engageable pawl 61 is also pivotally secured to the belt reel 13 about an axis 63 extending parallel to the axis of rotation 12 radially inwardly of the guide spigot 62' and offset somewhat in the peripheral direction opposite to the direction of rotation during belt unwinding. The engageable pawl 61 can also execute a restricted pivotal movement in a peripheral cutout 78 of the belt reel 13.

The belt reel 13 is surrounded in the region of the engageable pawl 61 by an inner ring of teeth formed on a steel plate 66, of which the tooth recesses 65 are complementary to the teeth 74' of a pawl arm 64 provided radially outwardly at the engageable pawl 61. The engageable pawl 61 is lightly biased in the unblocking direction by a non-illustrated spring.

In accordance with FIG. 8, a restricted rotary clearance exists between the shaft 13' of the belt reel 13 and the toothed ratchet wheel 29, with the toothed ratchet wheel 29 being so biased in the belt unwinding direction relative to the shaft 13' by means of a spiral spring 67 that an abutment 79 of the shaft 13' holds the toothed ratchet wheel 29 in the belt unwinding direction at the end of the rotary clearance 77. The spiral spring 67 should be so powerfully made that in all normally occurring belt pull out accelerations, the rotary movement of the toothed ratchet wheel 29 does not lag behind the rotary movement of the belt reel 13.

In accordance with FIG. 8 a rotary acceleration lever 38 is pivotally connected to the toothed ratchet wheel 29 about a pivot axis 68 extending parallel to and displaced relative to the axis of rotation 12 and has two lever arms 38' and 38". A resetting spring 70 holds the rotary acceleration lever 38 normally in the position shown in full lines in FIG. 8, where it comes into contact against various abutments 71, 72, 73. The rotary acceleration lever 38 is so shaped and arranged that it does not move at any desired speeds, but is pivoted with rotary accelerations in the belt unwinding direction in FIG. 8 in the clockwise sense about the pivot axis 68, when a predetermined rotary acceleration limit is exceeded. The resetting spring 70 must likewise be dimensioned in corresponding manner.

On the lever arm 38' the rotary acceleration lever 38 has a blocking tooth 69, which can cooperate with the teeth of an inner toothed arrangement 26 of a toothed ring carrier member 25 projecting concentrically into the arrangement of ratchet teeth 30, when the rotary acceleration lever 38 is pivoted by a rotary acceleration in the belt unwinding direction above the predetermined rotary acceleration limit value, out of the position shown in full lines in FIG. 8 into the position shown in broken lines which is determined by abutments 71, 74, 75.

As soon as the blocking tooth 60 has moved into engagement in the inner toothed arrangement 26, the toothed ratchet wheel 29 remains stationary while the belt reel 13 can be rotated further by an amount within the rotary clearance 77 with further tensioning of the spring 67. During this, as a result of the displacement of the axis of rotation 63 about the axis of rotation 12 and of the displacement of the guide spigot 62' within the elongate hole 76, the pawl arm 64 of the engageable pawl 61 can be pivoted or shifted, in accordance with FIG. 9, into the blocking position shown in broken lines in FIG. 9, in which the teeth 64' of the pawl arm 64 engage into the tooth recesses 65' of the inner ring of teeth 65. Through this engagement, a further rotation of the belt reel 13 in the belt winding direction is prevented.

The ratchet teeth 30 of the toothed ratchet wheel 29 cooperate with an engageable and disengageable blocking pawl 17 which is shown in FIGS. 2 to 7 and is mounted outside of the periphery of the toothed ratchet wheel 29 on the housing 33. On engagement into the ratchet teeth 30 of the toothed ratchet wheel 29 the blocking pawl 17 blocks the latter against rotation in the belt pull-out direction, whereby with a further attempted pull-out of the safety belt 11 a relative rotation results between the belt reel 13 and the toothed ratchet wheel 29 within the rotary clearance that is provided through ca. 10 to 15°, which leads to the engagement of the pawl arm 64 into the inner toothed ring 65, whereupon the rotation of the belt reel 13 and thus the further pull-out of the safety belt 11 is also blocked.

The toothed ratchet wheel 29, which is of pot-like shape, engages in accordance with FIG. 1 axially over a substantially circular ring-like toothed ring support member 25 fixed to the housing and having teeth 26 at its inner periphery which cooperate with a rotary acceleration lever 38. Rotary acceleration lever 38 is rotationally fixedly connected to the toothed ratchet wheel 29 and enters into engagement with the inner teeth 26 in a manner which blocks the further pull-out on attempted rapid pull-out of the safety belt 11.

In accordance with the FIGS. 2 to 6 an acceleration blocking mechanism 55 fixedly arranged on the housing is located in the peripheral region of the toothed ratchet wheel 29 and has an acceleration sensor 56 which also responds to deviations of the vehicle position from the normal horizontal arrangement as well as a blocking pawl 57 which, in the drawn-in state, comes out of engagement with one of teeth 30 of the toothed ratchet wheel 29 and, in the projecting state, comes into engagement with one of the teeth 30 of the toothed ratchet wheel 29. Normally, the blocking pawl 57 is located in the retracted state shown in the FIGS. 2 to 6. If the acceleration sensor 56 measures an acceleration of the vehicle which exceeds a predetermined value, such as for example arises during an accident, or if it detects a significant deviation of the vehicle position from the normal horizontal arrangement, then the blocking pawl 57 is moved in the direction of the toothed ratchet wheel 29 to such an extent that it comes into engagement with the latter and thereby moves the control pawl 61 into the inner toothed ring 65 so that from then on the further pull-out of the safety belt 11 is blocked.

As soon as the acceleration of the vehicle ends, the blocking pawl 57 comes out of engagement with the toothed ratchet wheel 29 again—optionally following a short reverse rotation of the toothed ratchet wheel 29 brought about by the spiral spring 15. Accordingly the spring force active between the belt reel 13 and the toothed ratchet wheel 29, i.e. and the control pawl 61, can rotate the toothed ratchet wheel 29 back again relative to the shaft 13', up to the end of the rotary clearance lying in the belt unwinding direction, can in this manner bring the pawl arm 64 out of engagement with the inner toothed ring 65 and can thus release the safety belt 11 for the further pull-out.

Moreover, the toothed ring support member 25 has a further approximately wave-shaped inner toothed ring 20 axially adjoining the inner teeth 26 and having radially inwardly extending teeth 41. A toothed control wheel 21 is located within the inner toothed ring 20 and has a smaller diameter and a smaller number of teeth 40. In the illustrated embodiment the inner toothed ring 20 has 27 teeth, the toothed control wheel 21 in contrast has only 26 teeth. The diameter of the toothed control wheel 21 is just so much smaller than the diameter of the inner toothed ring 20 that, with engagement of the teeth 40, 41 on one side of the toothed control wheel, a small radial spacing remains between the inner toothed ring 20 and the toothed control wheel 21 on the diametrically opposite side.

The toothed control wheel 21 has a central bearing bore 28 into which an eccentric disc 27 engages which is rotationally fixedly journalled on the shaft 13' engages. If the eccentric disc 27 is rotated in the direction of the arrow in FIG. 2 on pulling out the safety belt 11, then the toothed control wheel 21 rolls off on the inner toothed ring 20 in the counterclockwise sense. Axially directly adjoining the toothed control wheel 21 and the eccentric disc 27 there is a cam ring 18 having a central bore 19 at the inside. The cam ring 18 is rotatably arranged on a hollow bearing spigot 16 of the housing fixed relative to the housing at the side remote from the belt reel 13. A driver pin 24 projects from the cam ring 18 in the direction of the toothed control wheel 21 into a driver recess 23 of the toothed control wheel 21, with no clearance existing in the circumferential direction between the driver pin 24 and the radial edges of the driver recess 23, whereby a rotationally fixed connection is produced between the cam ring 18 and the toothed control wheel 21. In the radial direction the driver recess 23 is, however, extended so far that a radial relative movement between the cam ring 18 and toothed control wheel 21 is possible when the toothed control wheel 21 executes the eccentric rolling off movement on the inner toothed ring 20. As an alternative, the driver pin could also be provided on the toothed control wheel and the driver recess at the cam ring.

At its periphery, the cam ring has, in accordance with FIG. 2, a first angular region 45 and a second angular region 48. Whereas the first angular region 45 extends over an angle of about 200°, the second angular region 48 takes up an angle of about 160°.

At the start of the angular region 45 lying at the top in FIG. 2 there is a radially extending abutment step 46 on the cam ring 18 which merges in the counterclockwise sense into a partial, right cylindrical, peripheral surface 51. After an angle of about 140° the peripheral surface 51 is adjoined in the counterclockwise sense by an abutment step 47 which projects radially outwardly by a somewhat smaller amount and which merges into a partial, right cylindrical, peripheral surface 54 with a somewhat larger diameter than the peripheral surface 51.

In the clockwise sense and in the peripheral direction an initially partly right cylindrical cam surface 49 adjoins the abutment step 46 and, after an angle of somewhat more than 60°, drops off radially inwardly to the periphery of the peripheral surface 54 via an inclined flank 32.

In accordance with FIG. 2 a switching arm 52 of a rocker element 53 secured to the housing lies in the lower region radially outwardly against the peripheral surface 54 and is tiltable about a rocker axis 44 extending parallel to the axis 12. The rocker element 53 has an actuating pin 43 extending parallel to the rocker axis 44 which engages into a radial slot 42 of a doubled-armed lever 39 carrying the blocking pawl 17 and having an axis of rotation 34 parallel to the axis 44 in order to transfer the rocking movement to the blocking pawl 17. A U-shaped spring 31 holds the rocker element 53 in its position which keeps the blocking pawl 17 out of engagement with the toothed ratchet wheel 29. The rocker element 53 has a second over-dead center position in which the blocking pawl 17 is located in engagement with the toothed ratchet wheel 29.

The blocking pawl 17 projects axially in the direction of the belt reel 11 to such an extent that it can enter radially into engagement with the ratchet teeth 30 of the toothed ratchet wheel 29 from the outside. The blocking pawl 17 is shown out of engagement with the ratchet teeth 30 in FIGS. 2, 3 and 6 and in engagement with the ratchet teeth 30 in FIGS. 4 and 5.

A micro-switch 50 is mounted on the housing approximately diametrically opposite to the rocker element 53 and activates or deactivates a belt tensioner 35 only schematically indicated in FIG. 1 via a control line 37 simply indicated in broken lines in FIG. 1. The belt tensioner 35 is triggered on an acceleration of the vehicle caused by an accident and subsequently rotates the belt reel 13, via a clutch 36 engaged at the same instant, by an amount in the belt winding-up direction such that the belt 11 firmly contacts the occupant.

Since, if the safety belt 11 is not being worn, the belt tensioner 60 should also not trigger even with accelerations caused by an accident, it is deactivated when the safety belt 11 is drawn in via the control line 62.

In accordance with FIGS. 2 to 6 an actuating plunger 22 (see the black arrow in FIGS. 2, 3) extends radially inwardly from the micro-switch 50 and is located by the force of the spring 59 in contact with the switching cam track 49. In the state illustrated in FIG. 3, the micro-switch 50 is actuated in a manner such that it activates the belt tensioner 35 via the control line 37 (FIG. 1).

However, if the cam surface 49 is located in the position shown in FIG. 2, the actuating plunger 22 is pressed radially outwardly at the position emphasized by a black arrow in order to actuate the micro-switch 50 so that it deactivates the belt tensioner 35 via the control line 37.

In the fully retracted position of the safety belt 11 shown in FIG. 2 the switching arm 52 contacts the peripheral surface 54 having a larger diameter, or lies closely adjacent it. In this position the blocking pawl 17 is out of engagement with the toothed ratchet wheel 29. At the side of the cam ring 18 remote from the belt reel 13 a spiral spring 15 is arranged in the housing 33 in accordance with FIG. 1. It exerts a torque in the belt winding-up direction onto the shaft 13' of the belt reel 13 so that the belt is always at least loosely contacted against the belted up occupant or fully drawn in when the belt is removed.

If now the belt 11 is drawn out (FIG. 3) from the fully drawn-in position of FIG. 2, then the eccentric disc 27 rotates in the clockwise sense and the toothed control wheel 21 in the counterclockwise sense. During this, the cam ring 18 is likewise driven with it in the counterclockwise sense. In the region of a belt pull-out of, for example, 600 mm the plunger 22 passes under the force of the spring 59 from the cam surface 49 which projects radially outwardly to the greatest degree, via the flank 32 extending obliquely to the cam track surface 49, to the peripheral surface 54 and switches over the micro-switch 50 into the activating position. During this movement, the switching arm 52 leaves the peripheral surface 54 but remains, because of the action of the spring 31, in the over-dead center position which causes the blocking pawl 17 to be out of engagement with the toothed ratchet wheel 29.

Figure 4:
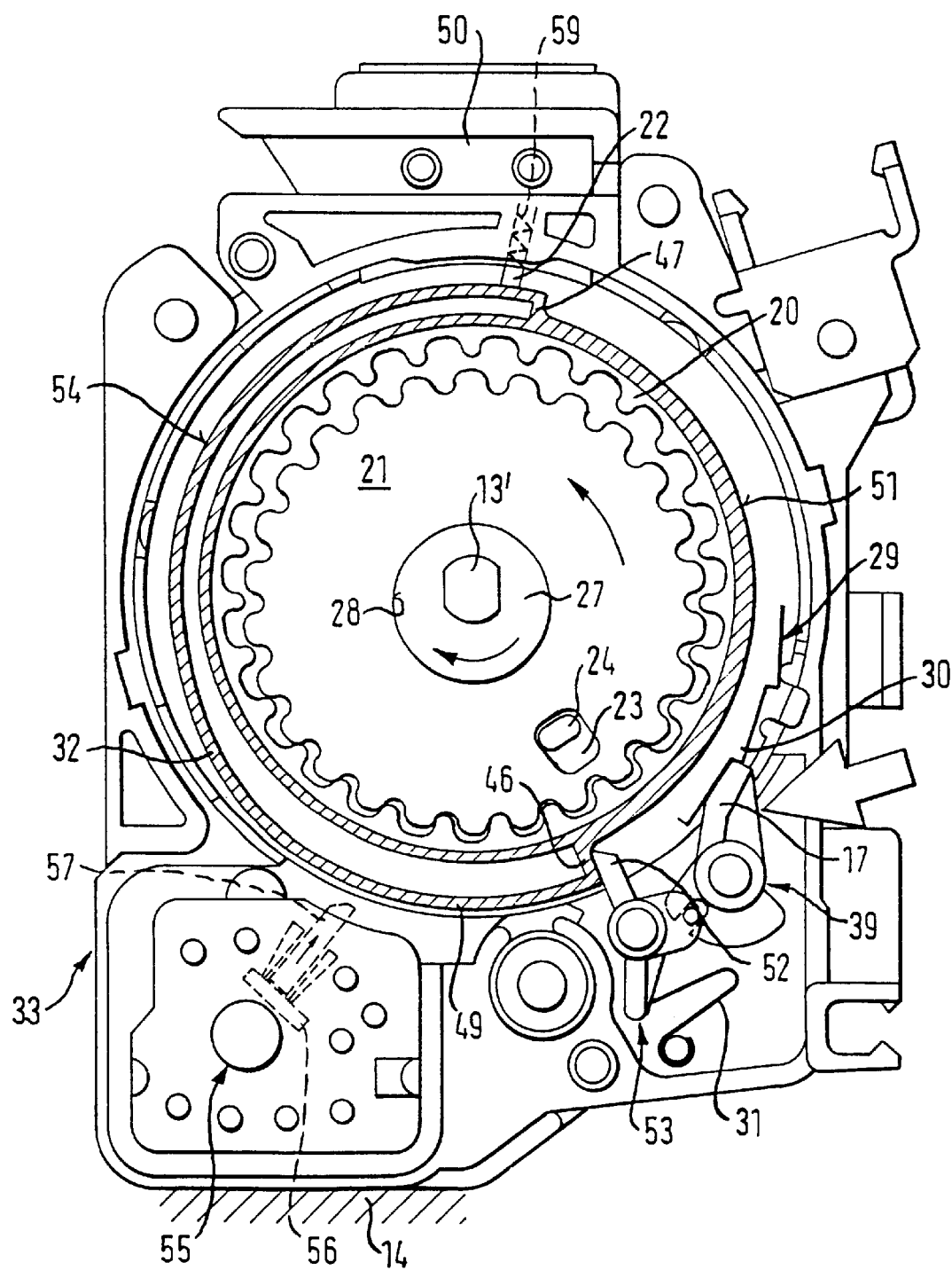

As soon as the safety belt 11 is drawn in fully, the abutment step 46 contacts the switching arm 52, in accordance with FIG. 4, which thereby pivots the rocker element 53 in the clockwise sense into the other over-dead center position, which in turn results in a pivoting movement of the blocking pawl 17 in the counterclockwise sense, and thus the entry into engagement of the blocking pawl 17 with the teeth 30 of the toothed ratchet wheel 29 (black arrow in FIG. 4).

Figure 5:
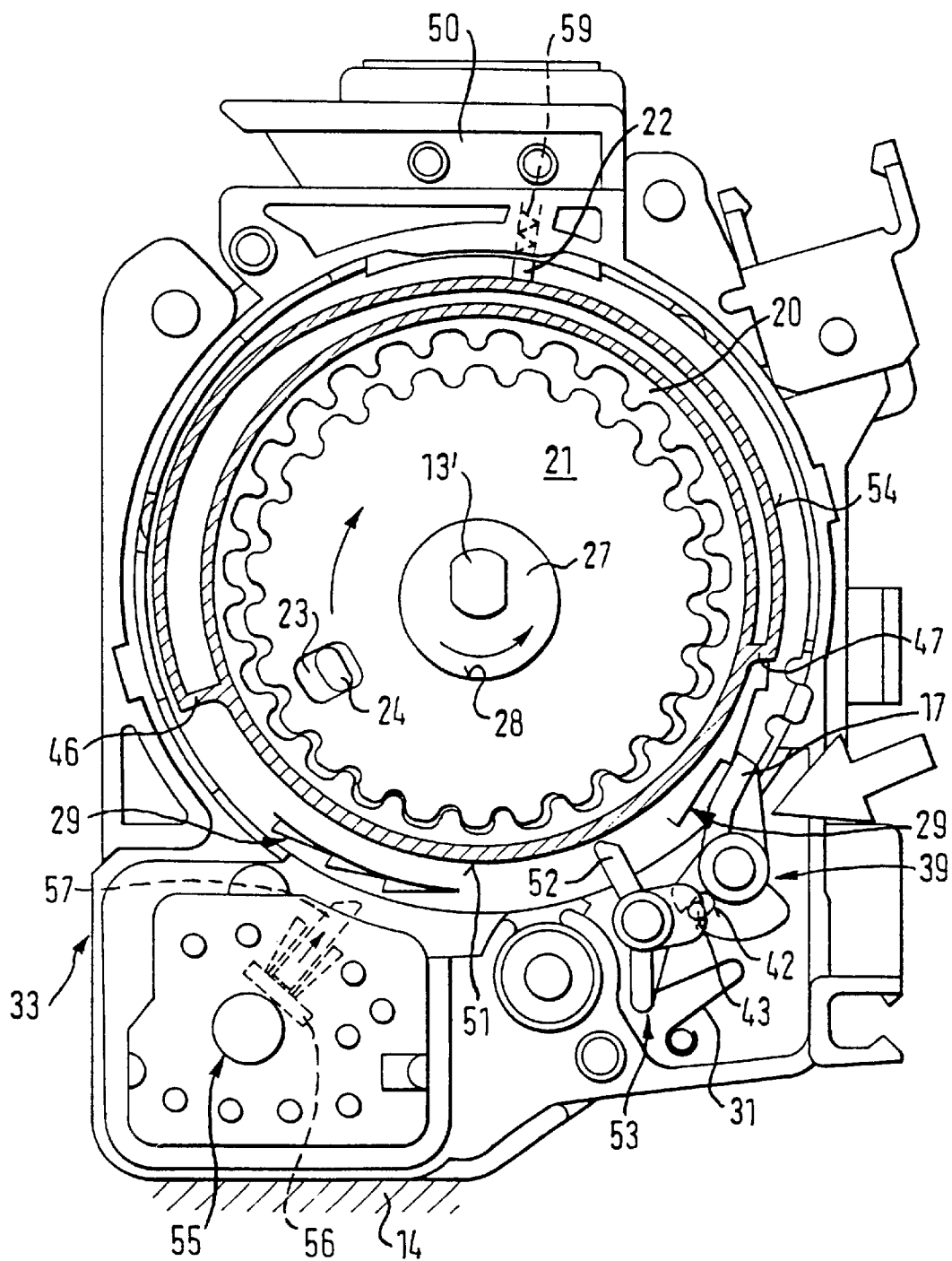

When the pull-out force on the safety belt 11 subsequently drops, the eccentric disc 27 rotates as a result of the action of the spiral spring 15 in the counterclockwise sense as is shown in FIG. 5. The toothed ratchet wheel 21 now executes a movement in the clockwise sense. The abutment step 46 thereby lifts from the switching arm 52 which, however, retains, as a result of its over-dead center position of the rocker element 53, the position in which the blocking pawl 17 stands in engagement with the toothed ratchet wheel 29 (black arrow in FIG. 5). As long as the belt has been drawn in by about 600 mm, this position of the switching arm 52 and also of the actuating plunger 22 is maintained, i.e. the actuating plunger 22 remains extended and the micro-switch 50 holds the belt tensioner 35 active now as previously.

Figure 6:
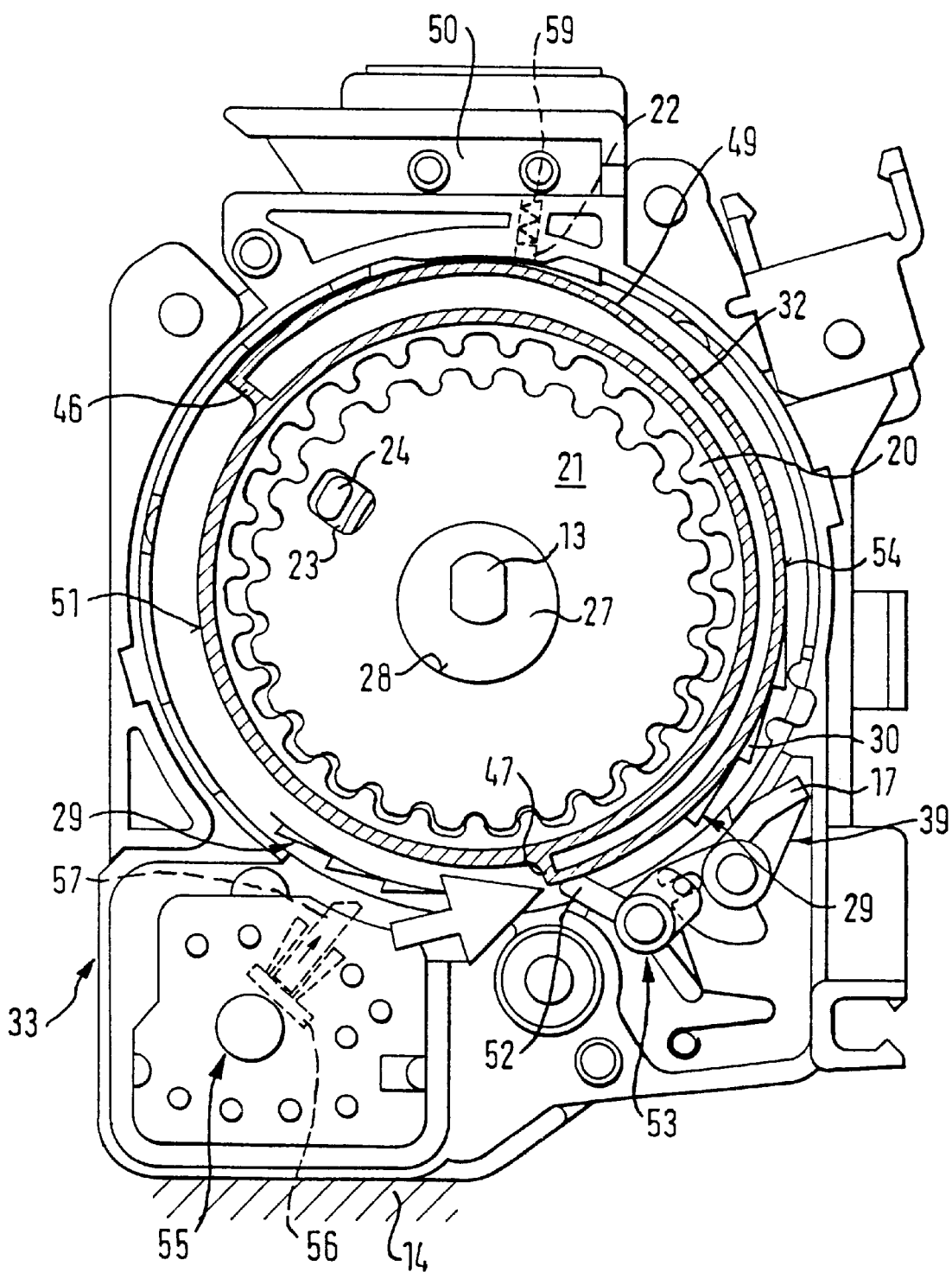

Only when the belt pull-out has reduced, in accordance with FIG. 6, to below 600 mm does the abutment step 47 contact the switching arm 52 which thereby pivots the rocker element 53 in the counterclockwise sense into the opposite over-dead center position (black arrow in FIG. 6) and thus brings the blocking pawl 17 out of engagement with the toothed ratchet wheel 29. At the same time, the actuating plunger 22 is thrust radially outwardly by the radially rising flank and by the switching cam surface 49 projecting radially outwardly to the greatest degree, whereby the micro-switch 50 is changed over into a position which deactivates the belt tensioner 35 via the control line 37 (FIG. 1). This position of the switching pawl 17 and of the actuating plunger 27 does not change anymore when the belt is finally fully retracted into the position of FIG. 2.

Thus, in accordance with the invention, through the restriction of the angular range used for the switching over the blocking pawl to only somewhat more than 180°, a situation is achieved in which the remaining angular region of ca. 160° can be used for the changeover of the micro-switch 50 and optionally for the influencing of the further switching processes.

Figure 7:
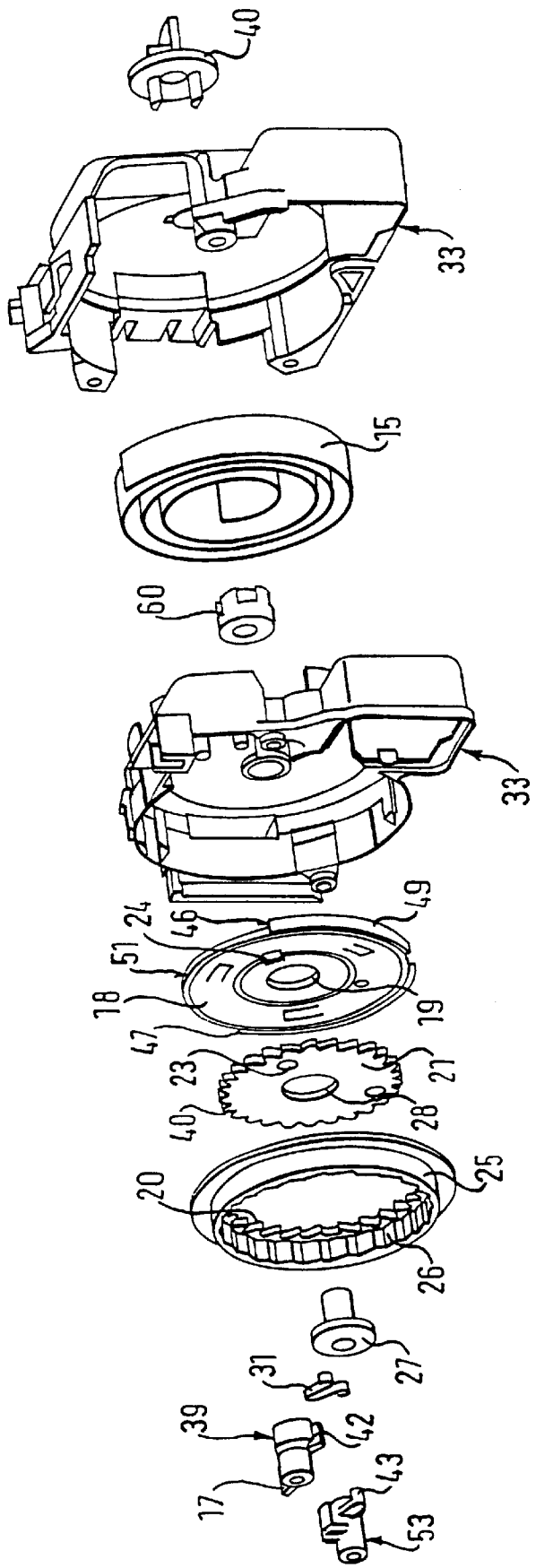

In FIG. 7 the components of the belt reeling mechanism of the invention which are important for the invention are shown in an exploded illustration. A spring biasing element 40 thereby serves as an assembly aid. A torque transmission member 60 is provided for the transmission of the torque of the spiral spring 15 onto the cam disc 27, i.e. the shaft 13' of the belt reel.

REFERENCE NUMERAL LIST 11 safety belt
12 axis of rotation
13 belt reel
13' shaft
14 vehicle chassis
15 spiral spring
16 housing-hollow spigot
17 blocking pawl
18 cam ring
19 central bore
20 inner toothed ring
21 toothed control wheel
22 actuating pin
23 driver pin
24 driver recess
25 toothed ring support member
26 teeth
27 eccentric disc
28 bearing bore
29 toothed ratchet wheel
30 ratchet teeth
31 spring
32 flank
33 housing
34 axis of rotation
35 belt tensioner
36 clutch
37 control line
38 rotary acceleration lever
38' lever arm
38" lever arm
39 lever
40 spring bias element
41 tooth
42 radial slot
43 actuating pin
44 rocker axis
45 first angular region 46 abutment step
47 abutment step
48 second angular region
49 cam surface
50 micro-switch
51 peripheral surface
52 switching arm
53 rocker element
54 peripheral surface
55 acceleration blocking mechanism
56 acceleration sensor
57 block pawl
58 hub
59 spring
60 torque transmission member
61 control pawl
62 axis
63 axis
64 pawl arm
64' tooth
65 inner toothed ring
65' tooth recess
66 steel plate
67 rotary clearance spring
68 pivot axis
69 blocking tooth
70 resetting spring
71 abutments
72 abutment
73 abutment
75 abutment
76 elongate hole
77 rotary clearance
78 cutout
79 abutment

What is claimed is:

1. Safety belt apparatus for vehicles, in particular motor vehicles having
at least one safety belt, which is wound onto a belt reel rotatably secured in a housing on the vehicle chassis about an axis of rotation and biased by a spring retraction mechanism in the belt winding up direction and having
a belt draw out blocking mechanism which selectively blocks a further draw out of the safety belt, with a toothed ratchet wheel being rotationally coupled to the belt reel, and cooperating with a blocking pawl secured to the housing and movable into an out of engagement, so that with the blocking pawl moved into engagement with the toothed ratchet wheel, a rolling up movement of the belt reel by the spring retraction mechanism is possible, but not a pulling out of the safety belt, and
wherein, when the blocking pawl is located in engagement with the toothed ratchet wheel, the toothed ratchet wheel is rotatable against a spring force relative to the belt reel and can bring a control pawl attached to the belt reel into engagement with a toothed ring fixed to the housing, with the blocking pawl being movable into and out of engagement with respect to the toothed ratchet wheel by a cam ring concentric to the belt reel axis via a step down transmission so that the blocking pawl is moved out of engagement with a safety belt which is drawn in and is movable into engagement with a further drawn out safety belt,
wherein a toothed control wheel is connected to the belt reel via an eccentric transmission and has at a periphery a preferably wave-like arrangement of teeth, which is surrounded by an inner toothed ring fixed to the housing of larger diameter and with complementary teeth, but with larger number of teeth, such that the toothed control wheel stands in meshing arrangement with the inner toothed ring over a restricted peripheral region and the two arrangements of teeth have a radial spacing diametrically opposite thereto such that the toothed control wheel rolls off on the inner toothed ring on rotation of the belt reel, and wherein the total draw out length of the safety belt corresponds to an angle of rotation of the toothed control wheel relative to the axis of rotation of less than 360°,
wherein the toothed control wheel is rotationally fixedly connected to the cam ring, but radially displaceable in accordance with eccentric movement of the toothed control wheel, wherein the cam ring includes switching mechanism along a first angular region for the engagement and disengagement of the blocking pawl, and at least one switching element along a second angular region for at least one further belt draw out dependent switching operation.

2. Safety belt apparatus in accordance with claim 1, further comprising a driver pin extends from the cam ring into a driver recess of the toothed control wheel complementary to it in the peripheral direction, the driver recess having a radial extent such that the driver pin can be freely radially displaced therein during the eccentric movement of the toothed control wheel, with it also being possible to provide the driver pin on the toothed control wheel and the driver recess on the cam ring.

3. Safety belt apparatus in accordance with claim 1, wherein the cam ring has a part right cylindrical circumferential surface along the first angular region at the ends of which in the peripheral direction radially outwardly projecting abutment steps are provided, which cooperate with a switching arm of a rocker element acting on the blocking pawl with two over-dead center positions such that the one abutment step, on striking the switching arm, pivots the rocker element into the position which brings the blocking pawl into engagement with the toothed ratchet wheel, and the other abutment step, on striking the switching arm, pivots the rocker element into the position which brings the blocking pawl out of engagement with the toothed ratchet wheel.

4. Safety belt apparatus in accordance with claim 3, wherein the abutment step which becomes active during the drawing in of the belt strikes against the switching arm of the rocker element when the safety belt is not fully drawn in, and in that the switching arm subsequently lies adjacent a part right cylindrical peripheral surface with a radius greater by the height of the abutment step.

5. Safety belt apparatus in accordance with claim 3, wherein the abutment steps have an angular spacing of 120° to 160°.

6. Safety belt apparatus in accordance with claim 3, wherein the first angular range amounts to 180° to 220°.

7. Safety belt apparatus in accordance with claim 3, wherein the second angular range amounts to 140° to 180°.

8. Safety belt apparatus in accordance with claim 1, wherein the cam ring has a central bore rotatably journalled on a central hollow bearing spigot fixed relative to the housing, within which the hub of an eccentric disc is rotationally journalled, and is arranged concentric to the belt reel.

9. Safety belt apparatus in accordance with claim 1, wherein the switching element is a switching cam track and actuates a micro-switch fixed relative to the housing for the activation of a belt tensioner after a predetermined draw out length of the safety belt from the fully drawn in state.

10. Safety belt apparatus in accordance with claim 9, wherein an actuating plunger of the micro-switch cooperates with the switching cam track so that the micro-switch deactivates the belt tensioner when the safety belt is drawn in and over an adjoining restricted draw out range and activates the belt tensioner with a draw out which goes beyond the restricted draw out range.

11. Safety belt apparatus in accordance with claim 10, wherein the actuating plunger is thrust radially outwardly by the switching cam track against the spring force when the safety belt is drawn in and, on the far side of the restricted draw out range, is shifted by spring force onto the switching cam track which extends radially inwardly.

12. Safety belt apparatus in accordance with claim 9, wherein the belt tensioner is activated by the micro-switch after a belt is drawn out by 400 mm to 800.

13. Safety belt apparatus in accordance with claim 12, wherein when the belt is drawn in from the fully drawn out state up to a drawn out belt length of 400 mm to 800 mm, only a belt draw in is possible, but not a belt draw out, and in that with a greater belt draw in the blocking pawl is brought out of engagement with the toothed ratchet wheel and the belt tensioner is simultaneously deactivated.

14. Safety belt apparatus for vehicles comprising:
- a rotatable belt reel adapted to have a safety belt wound thereon, the belt reel being disposed in a housing adapted to be secured to a vehicle chassis and biased by a spring retraction mechanism in a direction which winds the safety belt onto the reel;
- a belt draw out blocking mechanism which selectively blocks draw out of the safety belt, comprising:
    - a toothed ratchet wheel coupled to the belt reel for rotation therewith;
    - a cam ring;
    - a toothed control wheel, the toothed control wheel being constantly connected to the cam ring for simultaneous rotation therewith;
    - an eccentric transmission which connects the toothed control wheel to the belt reel;
    - an inner toothed ring which is fixed to the housing and which is in constant meshing engagement with the toothed control wheel; and
    - a blocking pawl operated by the cam ring so as to be selectively engageable with the toothed ratchet wheel;
- wherein one of the toothed control wheel and the cam ring has a driver recess and the other of the toothed control wheel and the cam ring has a driver pin which is received in the driver recess, the driver recess being elongate in the radial direction to permit radial movement of the driver pin therein.

* * * * *